(12) United States Patent
Makino et al.

(10) Patent No.: US 9,059,438 B2
(45) Date of Patent: Jun. 16, 2015

(54) FUEL CELL SYSTEM

(71) Applicant: Nissan Motor Co., Ltd., Yokohama, Kanagawa (JP)

(72) Inventors: Shinichi Makino, Kawasaki (JP);
Yasushi Ichikawa, Kanagawa (JP);
Mitsunori Kumada, Yokosuka (JP);
Takahiro Fujii, Kanagawa (JP);
Ryouichi Shimoi, Yokohama (JP);
Shinichi Miyazaki, Yokohama (JP);
Daigo Iwasaki, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 110 days.

(21) Appl. No.: 13/778,753

(22) Filed: Feb. 27, 2013

(65) Prior Publication Data

US 2013/0224616 A1     Aug. 29, 2013

(30) Foreign Application Priority Data

Feb. 29, 2012     (JP) ................................. 2012-043869

(51) Int. Cl.
*H01M 8/04*     (2006.01)

(52) U.S. Cl.
CPC ...... *H01M 8/04223* (2013.01); *H01M 8/04313* (2013.01); *Y02E 60/50* (2013.01); *H01M 8/04955* (2013.01); *H01M 8/04089* (2013.01); *H01M 8/04388* (2013.01); *H01M 8/04447* (2013.01)

(58) Field of Classification Search
CPC .............. H01M 8/00; H01M 8/04089; H01M 8/04223; H01M 8/04313; H01M 8/04388; H01M 8/04447; H01M 8/04955; Y02E 60/50
USPC ......... 429/408, 427, 428, 429, 430, 431, 432, 429/443, 448, 449
See application file for complete search history.

(56) References Cited

U.S. PATENT DOCUMENTS

2002/0172845 A1*   11/2002   Shimada et al. ................ 429/19
2009/0087702 A1*   4/2009   Yonekura et al. ............... 429/13
2010/0167132 A1*   7/2010   McLean et al. ............... 429/416

FOREIGN PATENT DOCUMENTS

JP     2005-026054 A     1/2005

* cited by examiner

*Primary Examiner* — Patrick Ryan
*Assistant Examiner* — Ben Lewis
(74) *Attorney, Agent, or Firm* — Global IP Counselors, LLP

(57) ABSTRACT

A fuel cell system includes a fuel cell, a control valve and a controller. The controller controls the control valve to periodically increase and decrease the anode gas pressure downstream of the control valve. The controller executes a shutdown operation of the fuel cell by closing the control valve to stop the anode gas and shutting down power generation of the fuel cell upon receiving a shutdown command. The controller estimates an anode gas concentration at a location where the anode gas concentration is locally lower within a power generation region of the fuel cell based on a control state of the anode gas at a time the shutdown command is issued. The controller determines whether to permit or prohibit shutting down the power generating operation based on the anode gas concentration.

17 Claims, 14 Drawing Sheets

FUEL CELL SYSTEM

CROSS-REFERENCE TO RELATED APPLICATIONS

This application claims priority to Japanese Patent Application No. 2012-043869, filed in Japan on Feb. 29, 2012. The entire disclosure of Japanese Patent Application No. 2012-043869 is hereby incorporated herein by reference.

BACKGROUND

1. Field of the Invention

The present invention generally relates to a fuel cell system.

2. Background Information

There is a conventionally known technology that continues the power generation of a fuel cell without shutting down when a determination is made that a degradation in the performance of a fuel cell will occur when starting a fuel cell the next time after the fuel cell is shut down (refer to Japanese Laid-Open Patent Application No. 2005-26054). In particular, Japanese Laid-Open Patent Application No. 2005-26054 discloses that a determination is made that degradation in performance will occur when the impurity concentration in the gas that contains an electrode active material fed to a fuel cell is above a prescribed value.

SUMMARY

In view of the state of the known technology, one aspect of the present disclosure is to provide an anode non-circulation type fuel cell system that is different from a circulation type fuel cell system that is disclosed in Japanese Laid-Open Patent Application No. 2005-26054, which normalize an extreme impurity concentration by using a circulating flow to avoid hydrogen starvation. In the anode non-circulating system, the impurities (the nitrogen and water) generated in the operation of the fuel cell are sent to a buffer tank arranged on the anode-off gas side by pulsation. However, when this system is shut down, the following problems are created.

When the system is shut down, as the hydrogen on the anode side is consumed by the oxygen that is cross-leaked from the cathode side, the pressure inside of the fuel cell stack becomes lower than the pressure on the anode-side, so that the impurity-containing gas in the anode-off gas gradually flows back. Consequently, in the power generation region when the system is shut down, there may be areas where the impurity concentration is locally higher in comparison to control by circulation. Therefore, there are cases where the system is shut down when the system should not be shut down when the power generation off time and the re-shutdown prohibition time are set based on the impurity concentration in the feeding gas and the off gas exhausted emitted the anode.

One object of the present invention is to make an accurate decision on whether to permit or prohibit shutting down the power generation operation of a fuel cell according to the anode gas concentration at a position when the anode gas concentration has been made locally lower in the power generation region of a fuel cell.

In view of the above, an anode non-circulation type fuel cell system is provided that basically includes a fuel cell, a control valve and a controller. The fuel cell is configured to receive anode gas and cathode gas to generate electric power. The control valve is configured to control pressure of the anode gas being fed to the fuel cell. The controller includes a pulsation operation control section, a shutdown control section, an anode gas concentration acquiring section and a shutdown operation determination section. The pulsation operation control section is configured to control the control valve so that the pressure of the anode gas flowing downstream of the control valve is periodically increased and decreased. The shutdown control section is configured to execute a shutdown operation of the fuel cell by closing the control valve to stop feeding of the anode gas and shutting down power generation of the fuel cell upon receiving a shutdown command to shut down the power generation. The anode gas concentration acquiring section is configured to estimate an anode gas concentration at a location where the anode gas concentration is locally lower within a power generation region of the fuel cell based on a control state of the anode gas at a time the shutdown command is issued. The shutdown operation determination section is configured to determine whether to permit or prohibit shutting down the power generating operation of the fuel cell based on the anode gas concentration that was estimated by the anode gas concentration acquiring section. Consequently, the degradation in the cathode catalyst can be suppressed during the time when the power generation is shut down.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1A:
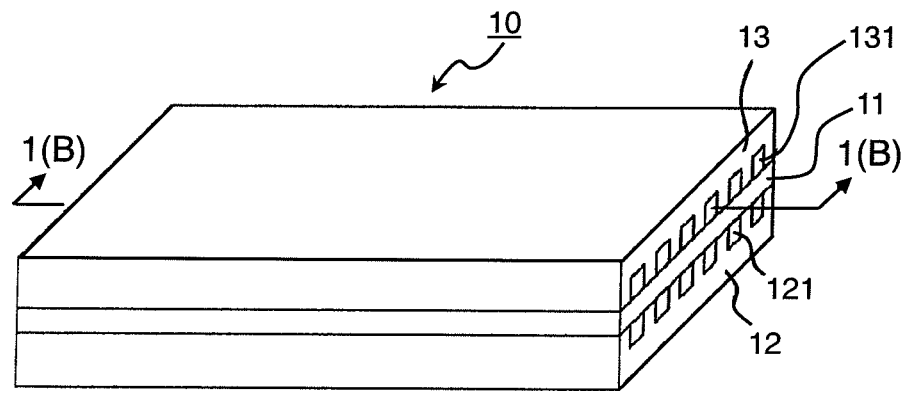
FIG. 1(A) is a simplified perspective view of a fuel cell in accordance with a first embodiment.
Figure 1B:
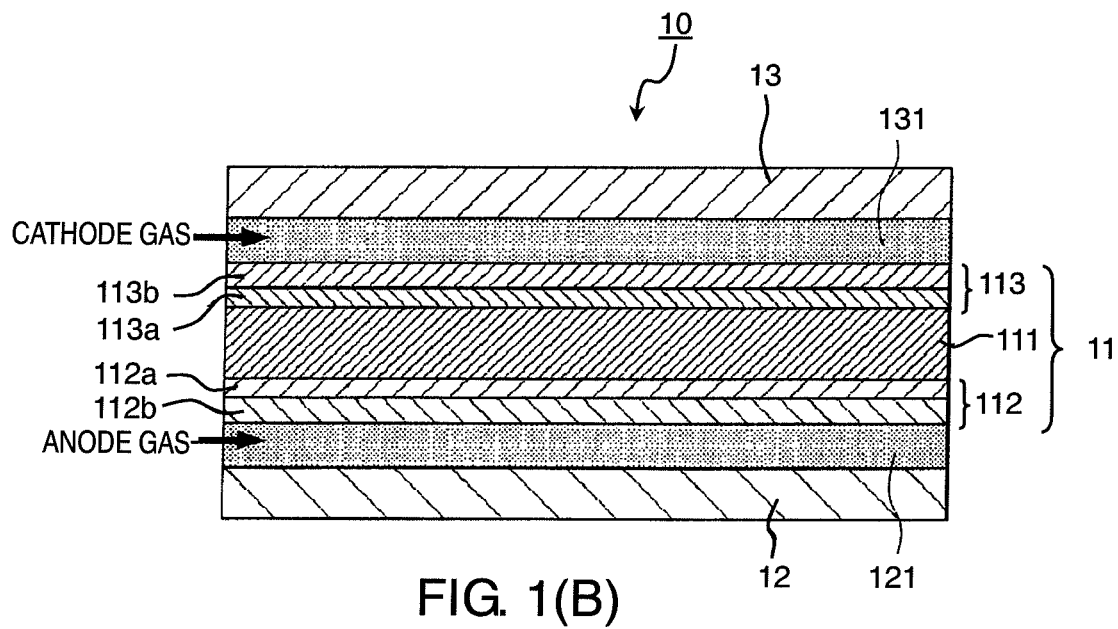
FIG. 1(B) is a simplified cross sectional view of the fuel cell that is illustrated in FIG. 1(A) as seen along section line 1(B)-1(B)

Referring initially to FIGS. 1(A) and (B), a fuel cell 10 is illustrated in accordance with a first embodiment. FIGS. 1(A) and 1(B) are diagrams explaining a basic configuration of a fuel cell system in the first embodiment. FIG. 1(A) is an oblique view of the fuel cell 10. FIG. 1(B) is a cross-sectional view of the fuel cell in FIG. 1(A) as viewed along section line 1(B)-1(B).

The fuel cell 10 has an electrolyte membrane sandwiched between an anode electrode (the fuel electrode) and a cathode electrode (the oxidizer electrode). Each fuel cell generates electric power when an anode gas (fuel gas) containing hydrogen is fed to the anode electrode and a cathode gas (oxidizer gas) containing oxygen is fed to the cathode electrode. The electrode reaction that develops in both electrodes of the anode electrode and the cathode electrode is as follows.

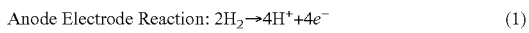

Anode Electrode Reaction: $2H_2 \rightarrow 4H^+ + 4e^-$ (1)

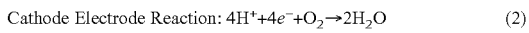

Cathode Electrode Reaction: $4H^+ + 4e^- + O_2 \rightarrow 2H_2O$ (2)

Each fuel cell generates about 1 volt of electromotive force by the electrode reactions in equations (1) and (2).

The fuel cell 10 has a configuration in which an anode separator 12 and the cathode separator 13 are arranged on the front surface and the rear surface of the membrane electrode assembly 11 (hereinafter to be referred to as the "MEA 11"), respectively. The MEA 11 includes an electrolyte membrane 111, an anode electrode 112 and a cathode electrode 113. The MEA 11 is arranged with the anode electrode 112 on one surface of the electrolyte membrane 111 and the cathode electrode 113 on the other surface. The electrolyte membrane 111 is a proton conductive ion exchange membrane made of a fluororesin. The electrolyte membrane 111 displays good electroconductivity in the wet state.

The anode electrode 112 includes a catalyst layer 112a and a gas diffusion layer 112b. The catalyst layer 112a is in contact with the electrolyte membrane 111. The catalyst layer 112a is formed from platinum or carbon black particles containing platinum, etc. The gas diffusion layer 112b is arranged on the outer side (the side facing away from the electrolyte membrane 111) of the catalyst layer 112a. The gas diffusion layer 112b is in contact with the anode separator 12. The gas diffusion layer 112b is formed from a material with a sufficiently high gas diffusion property and electroconductivity.

For example, the gas diffusion layer 112b can be formed from a carbon cloth woven from yarns made of carbon fibers or a carbon paper.

Similar to the anode electrode 112, the cathode electrode 113 also includes a catalyst layer 113a and a gas diffusion layer 113b.

The anode separator 12 is in contact with the gas diffusion layer 112b. The anode separator 12 has a plurality of a plurality of groove-shaped anode gas flow channels 121 on the side in contact with the gas diffusion layer 112b for feeding anode gas to the anode electrode 112.

The cathode separator 13 is in contact with the gas diffusion layer 113b. The cathode separator 13 has a plurality of groove-shaped cathode gas flow channels 131 on the side in contact with the gas diffusion layer 113b for feeding the cathode gas to the cathode electrode 113.

The anode gas flowing in the anode gas flow channels 121 and the cathode gas flowing in the cathode gas flow channel 131 can flow parallel with each other in the same direction, or they can flow parallel with each other yet opposite directions from each other. In addition, they can also flow orthogonal to each other.

When the fuel cell 10 is used as a power source on a vehicle, hundreds of fuel cells 10 are stacked to form a fuel cell stack to meet the high power requirement. Here, a fuel cell system is formed for feeding the anode gas and the cathode gas to the fuel cell stack, and the electric power for driving the vehicle is output from the fuel cell stack.

Figure 2:
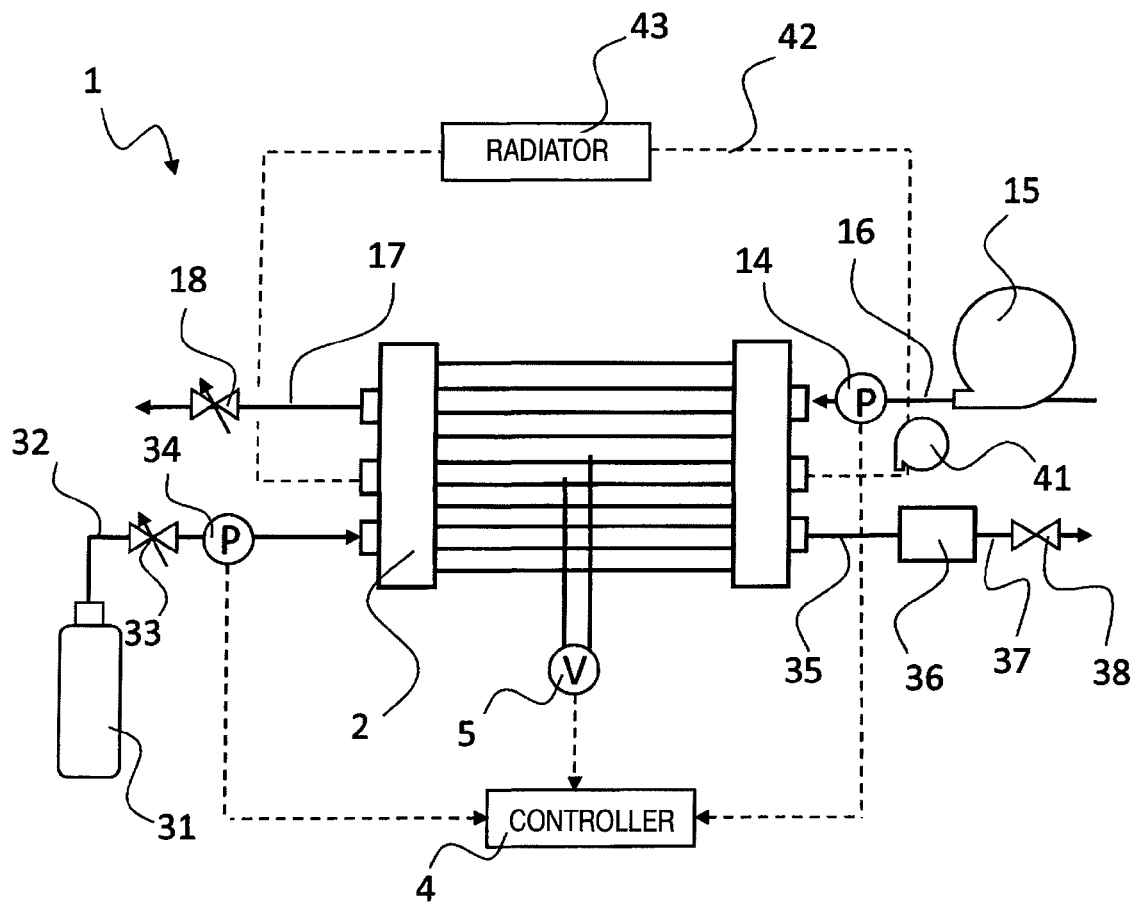
FIG. 2 is a schematic block diagram illustrating an anode non-circulation type fuel cell system in accordance with the first embodiment.

FIG. 2 is a schematic block diagram illustrating the configuration of an anode non-circulation type fuel cell system in accordance with the first embodiment. An anode non-circulation type fuel cell system supplies an anode gas (hydrogen gas) to the fuel cell stack without circulating the anode gas (hydrogen gas).

The fuel cell stack 2 is prepared by stacking a plurality (hundreds) of the fuel cells 10. As the anode gas and the cathode gas are fed to the fuel stack, the fuel stack generates the electric power needed for driving the vehicle (such as the electric power needed for driving the motor). According to the present embodiment, air is used as the cathode gas.

A high-pressure tank 31 is provided to store the high-pressure anode gas (hydrogen). The anode gas of the high-pressure tank 31 is fed via an anode gas feeding pipeline 32 (the fuel gas feeding flow channel) to the anode of the fuel cell stack 2. Here, instead of the high-pressure tank 31, hydrogen can be produced according to a modification reaction that uses alcohol, hydrocarbon, or the like as the raw feed material.

A pressure adjusting valve 33 is arranged in the anode gas feeding pipeline 32 for adjusting the feeding rate of the anode gas. The pressure adjusting valve 33 is, for example, an electromagnetic valve for continuous or stepwise adjustment of the opening degree. The opening degree of the pressure adjusting valve 33 is controlled by a controller 4. The pressure adjusting valve 33 constitutes an example of a control valve.

A pressure sensor 34 is arranged in the anode gas feeding pipeline 32 at a location downstream from the pressure adjusting valve 33. The pressure sensor 34 detects the pressure of the anode gas flowing in the anode gas feeding pipeline 32 at a location downstream from the pressure adjusting valve 33. In the present embodiment, the pressure of the anode gas (hereinafter referred to as the "anode pressure") detected with this pressure sensor 34 is a substitute for the pressure of the entire anode system that includes the anode gas flow channels 121 and a buffer tank 36 inside of the fuel cell stack.

An anode gas exhausting pipeline 35 has one end portion connected to the anode gas outlet hole of the fuel cell stack 2 and the other end portion connected to the upper portion of the buffer tank 36 (e.g., a buffer component). The anode gas exhausting pipeline 35 exhausts the excessive anode gas not used in the electrode reaction, a gas mixture of nitrogen and hydrogen, and other impurity gas (hereinafter to be referred to as "anode-off gas") cross-leaked from the cathode side to the anode gas flow channels 121.

The buffer tank 36 temporarily stores the anode-off gas flown through the anode gas exhausting pipeline 35. A portion of the steam in the anode-off gas is condensed in the buffer tank 36 to liquid that is then separated from the anode-off gas.

The purge path 37 has one end portion connected to the lower portion of the buffer tank 36. The other end portion of the purge path 37 is an open end. The anode-off gas and the liquid staying in the buffer tank 36 are then exhausted through the purge path 37 and from the open end to the outside air (ambient atmosphere).

A purge valve 38 is provided in the purge path 37. The purge valve 38 is an electromagnetic valve that continuously or stepwise adjusts the opening degree. The opening degree is adjusted under control by the controller 4. The amount of anode-off gas exhausted to the outside air through the purge path 37 from the buffer tank 36 is controlled by adjusting the opening of the purge valve 38 so that the anode gas concentration in the buffer tank 36 is kept within a prescribed range. The reason for this operation is as follows: if the anode gas concentration is too high in the buffer tank 36, the rate of the anode gas exhausted from the buffer tank 36 through the purge path 37 to the ambient atmosphere is increased, and creates a waste. On the other hand, if the concentration is too low, the fuel becomes insufficient to generate electric power, and the catalyst degrades.

The cathode gas (air) is fed from a compressor 15 via the feeding pipe 16 to the cathode of the fuel cell stack 2. It is possible to use an air feeding means such as a blower or the like instead of the compressor. A pressure sensor 14 is arranged in the feeding pipe 16 to detect the pressure of the cathode gas. The cathode gas exhausted from the cathode of the fuel cell stack 2 is released via the exhaust pipe 17 to the atmosphere. A pressure adjusting valve 18 is arranged in the exhaust pipe 17 for regulating the back pressure (the pressure in the cathode gas flow channel).

The cooling water is fed to the fuel cell stack 2 via a cooling water pipe 42 from a radiator 43. The temperature of the cooling water is increased by taking in the heat that was generated in the fuel cell stack 2. The cooling water is then fed via the cooling water pipe 42 to the radiator 43 where the cooling water is cooled. The cooling water is then recirculated back into the fuel cell stack 2. A cooling water pump 41 is arranged in the cooling water pipe 42 for circulating the water.

The controller 4 includes a microcomputer that comprises a Central Processing Unit (CPU), a Read Only Memory (ROM), a Random Access Memory (RAM) and an input/output interface (I/O interface).

The controller 4 receives various signals for indicating the operational status of the fuel cell system 1. In other words, various sensors detect various parameters of the operation state of the fuel cell system 1 and signals from these sensors are input to the controller 4. A pressure sensor 34 is provided to detect the anode pressure, and outputs a signal to the controller 4 for indicating the anode pressure. A pressure sensor 14 is provided to detect the cathode pressure, and outputs a signal to the controller 4 for indicating the cathode pressure. A voltage sensor 5 is provided to detect the voltage of the fuel cell stack 10, and outputs a signal to the controller 4 for indicating the voltage of the fuel cell stack 10.

Based on these input signals, the controller 4 executes a pulsation operation. In particular, the controller 4 periodically increases and decreases the anode pressure by periodically opening and closing the pressure adjusting valve 33. Also the controller 4 adjusts the opening degree of the purge valve 38 to regulate the flow rate of the anode-off gas exhausted from the buffer tank 36 and to maintain the anode gas concentration in the buffer tank 36 to be within a prescribed range.

The controller 4 also shuts down the power generation operation of the fuel cell stack 2 based on a shutdown command or instruction made to the fuel cells stack 2 to shut down the power generation operation and restarts the power generation operation of the fuel cell stack 2 when there is a command to restart the power generation operation after being shut down.

In addition, as to be explained later, the controller 4 estimates the anode gas concentration at the location in the power generation region of the fuel cell stack 2 where the anode gas concentration is locally lower. The controller then determines whether it is possible to carry out the process for the shutdown of the power generation operation of the fuel cell stack 2 based on the anode gas concentration that was obtained (the estimated anode gas concentration) as will be described later.

In the case of an anode non-circulation type fuel cell system 1, if the pressure adjusting valve 33 is left open and the anode gas is continually fed to the fuel cell stack 2 from the high-pressure tank 31, the anode-off gas containing unused anode gas exhausted from the fuel cell stack 2 continues to be exhausted to the outside air through the purge path 37 from the buffer tank 36, and this creates a waste.

Therefore, according to the present embodiment, the pressure adjusting valve 33 is periodically opened and closed by the controller 4, so that the anode pressure is periodically increased and decreased to perform the pulsation operation. When the pulsation operation is carried out, the anode-off gas staying in the buffer tank 36 flows back in the fuel cell stack 2 when the anode pressure decreases. As a result, it is possible to reuse the anode gas in the anode-off gas, so that decreasing the anode gas quantity exhausted to the ambient atmosphere is possible. As a result, waste can be prevented.

Figure 3:
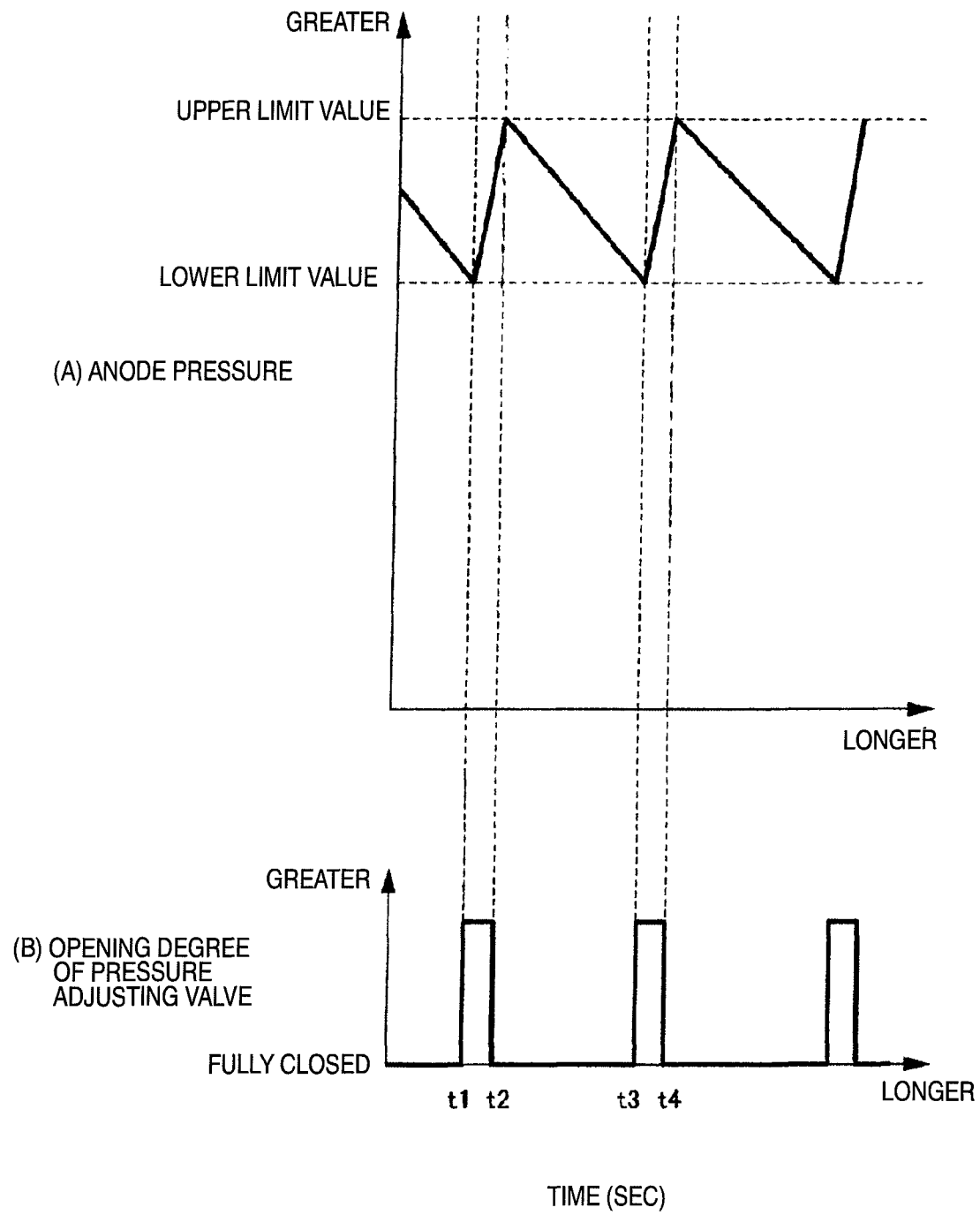
FIG. 3 is a time chart illustrating a pulsation operation when the operational status of a fuel cell system is in a steady state operation.

FIG. 3 includes diagrams illustrating the pulsation operation when the operation state of the fuel cell system 1 is in steady state.

As shown in the upper portion (A) of FIG. 3, the controller 4 computes the target output of the fuel cell stack 2 based on the operation state of the fuel cell system 1 (the load of the fuel cell stack). The controller 4 sets the upper limit value and the lower limit value of the anode pressure corresponding to the target output. Then, the anode pressure is increased and decreased periodically between the set upper limit value and the lower limit value for the anode pressure.

More specifically, when the anode pressure reaches the lower limit value at time t1, as shown in the lower portion (B) of FIG. 3, the pressure adjusting valve 33 is opened to the opening degree which at least allows the anode pressure to be increased to the upper limit value. In this state, the anode gas is fed from the high pressure tank 31 to the fuel cell stack 2, and the anode gas is exhausted from the buffer tank 36.

If the anode pressure reaches the upper limit value at time t2, as shown in the lower portion (B) of FIG. 3, the pressure adjusting valve 33 is fully closed, so that supply of the anode gas from the high-pressure tank 31 to the fuel cell stack 2 is shut down. As a result, due to the aforementioned electrode reaction of Equation (1), the anode gas left in the anode gas flow channels 121 inside of the fuel cell stack is used up over time, so that the anode pressure decreases corresponding to the consumption of the anode gas.

As the residual anode gas left in the anode gas flow channels 121 is consumed, the pressure in the buffer tank 36 is temporarily higher than the pressure in the anode gas flow channels 121, so that the anode-off gas flows back from the buffer tank 36 to the anode gas flow channels 121. As a result, the residual anode gas left in the anode gas flow channels 121 and the anode gas in the anode-off gas back flown to the anode gas flow channels 121 are consumed over time, and the anode pressure further decreases.

When the anode pressure reaches the lower limit value at time t3, the pressure adjusting valve 33 is opened in the same manner as at time t1. Then, when the anode pressure reaches the upper limit value again at time t4, the pressure adjusting valve 33 is fully closed.

Here, when carrying out this type of pulsation operation, at the time that the operational status of the fuel cell system 1 changes, specifically, at the time of a transient operation for decreasing the output of the fuel cells stack 2 to the target output by decreasing the target output of the fuel cell stack 2 (hereinafter referred to as the time of the down transient operation), a section of the anode gas flow channels 121 is created where the anode gas concentration is locally lower than the other sections inside of the anode gas flow channels 121. Below, this will be explained by referring to FIG. 4 and FIG. 5.

Figure 4:
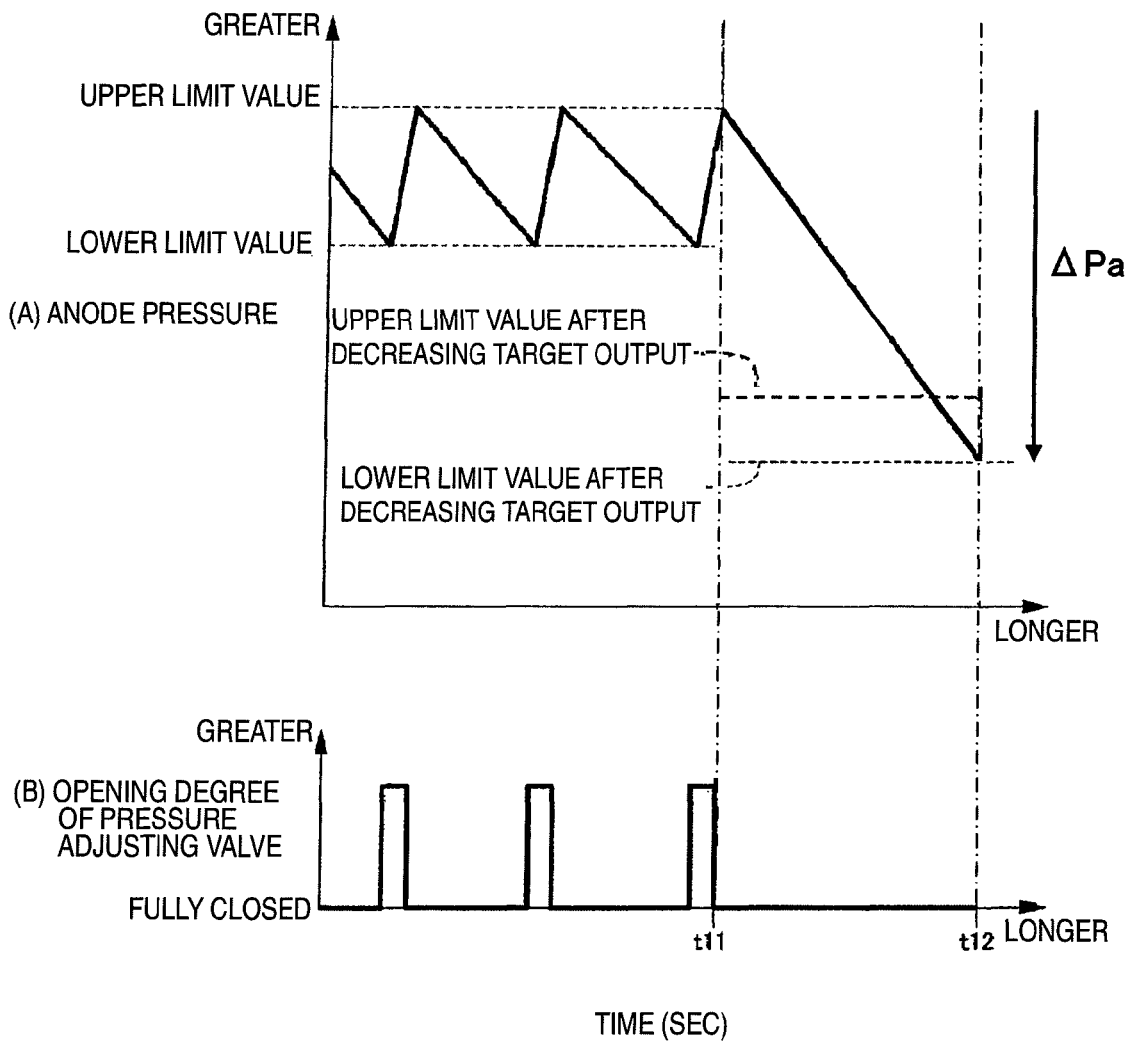
FIG. 4 is a time chart illustrating the change in the anode pressure in the case where the anode pressure is decreased to a lower limit pressure by completely closing the pressure adjusting valve at the time of a down transient operation.

FIG. 4 is a time chart showing the change in the anode pressure in the case wherein the anode pressure is decreased to the lower limit pressure by completely closing the pressure adjusting valve 33 at a time of the down transient operation.

At time t11, when, for example, the target output decreases for the fuel cell stack 2 due to a decrease in the accelerator pedal depression amount, the upper limit value and the lower limit pressure of the anode pressure are set to correspond to the decreased target output as shown in the upper portion (A) of FIG. 4. Since the amount of fuel consumed at a time of high output is higher, the anode pressure is set higher than at a time of low output.

In this case, as shown in portions (A) and (B) of FIG. 4, at time t11, the pressure adjusting valve 33 is fully closed, so that the anode pressure is decreased to the lower limit value (time t12), and the section is created inside of the anode gas flow channels 121 where the anode gas concentration is locally lower than the other sections inside of the anode gas flow channels 121. The reason for this feature will be explained with reference to FIG. 5.

Figure 5:
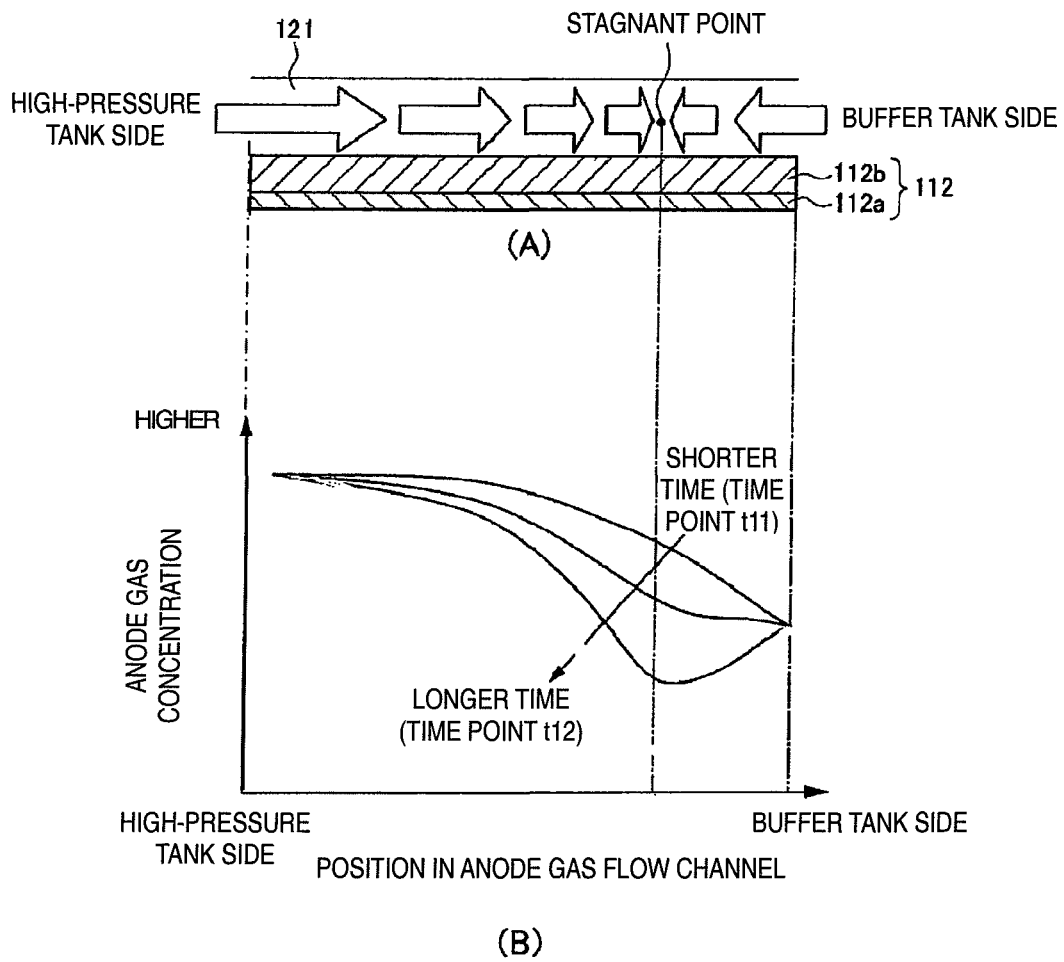
FIG. 5 is a diagram illustrating the cause for the generation of the portion in the anode gas flow channel with anode gas concentration locally lower than the remaining portions of the anode gas flow channel.

FIG. 5 is a diagram explaining the reason for creating the section inside of the anode gas flow channels 121 where the anode gas concentration is locally lower than in the other sections on the inside of the anode gas flow channels. The portion (A) of FIG. 5 is a diagram illustrating the flow of the anode gas and the anode-off gas in the anode gas flow channels 121 when the pressure adjusting valve 33 is fully closed in the down transition operation. The portion (B) of FIG. 5 is a diagram illustrating the anode gas concentration distribution over time in the anode gas flow channels 121 when the pressure adjusting valve 33 is fully closed in the down transition operation.

As shown in the portion (A) of FIG. 5, when the pressure adjusting valve 33 is fully closed, the residual anode gas left in the anode gas flow channels 121 flows due to inertia to the side of the buffer tank 36. Here, as the residual anode gas left in the anode gas flow channels 121 is consumed, the pressure in the buffer tank 36 temporarily exceeds that in the anode gas flow channels 121. Consequently, the anode-off gas flows back from the side of the buffer tank 36 to the anode gas flow channels 121.

As a result, at the merging section of the anode gas flowing in the anode gas flow channels 121 toward the side of the buffer tank 36 and the backflow of the anode gas from the side of the buffer tank 36 to the anode gas flow channels 121, a stagnant point where the gas flow rate becomes zero takes place.

When this type of stagnation point is created inside of the anode gas flow channels 121, nitrogen inside of the anode-off gas that had not been used in the electrode reaction of Equation (1) accumulates at the vicinity of the stagnation point with the lapse in time. As a result, the nitrogen concentration at the vicinity of the stagnation point is made higher than in other sections with the lapse in time, and the anode gas concentration at the vicinity of the stagnation point is made lower than in other sections with the lapse in time as shown in the portion (B) of FIG. 5. In the following explanation, as needed, the anode gas concentration at this stagnant point will be referred to as "the lowest anode gas concentration in the flow channel".

As explained above, after the down transition operation, a stagnant point exists inside of the anode gas flow channels 121, and a section where the anode gas concentration is locally lower than in the other sections is created inside of the anode gas flow channels 121. The degradation of the cathode catalyst that was described above is made notable in this section where the anode gas concentration is lower than in the other sections.

In the fuel cell system of the first embodiment, the lowest anode gas concentration Cmin in the flow channels is estimated by the controller 4 based on a control state of the anode gas at the time of the shutdown command. The controller 4 also determines the condition exists for the execution of the shutdown/restart operation of the fuel cell stack 2 based on the lowest anode gas concentration Cmin that was estimated in the flow channels (hereinafter to be referred to as the estimated lowest anode gas concentration Cmin).

Figure 6:
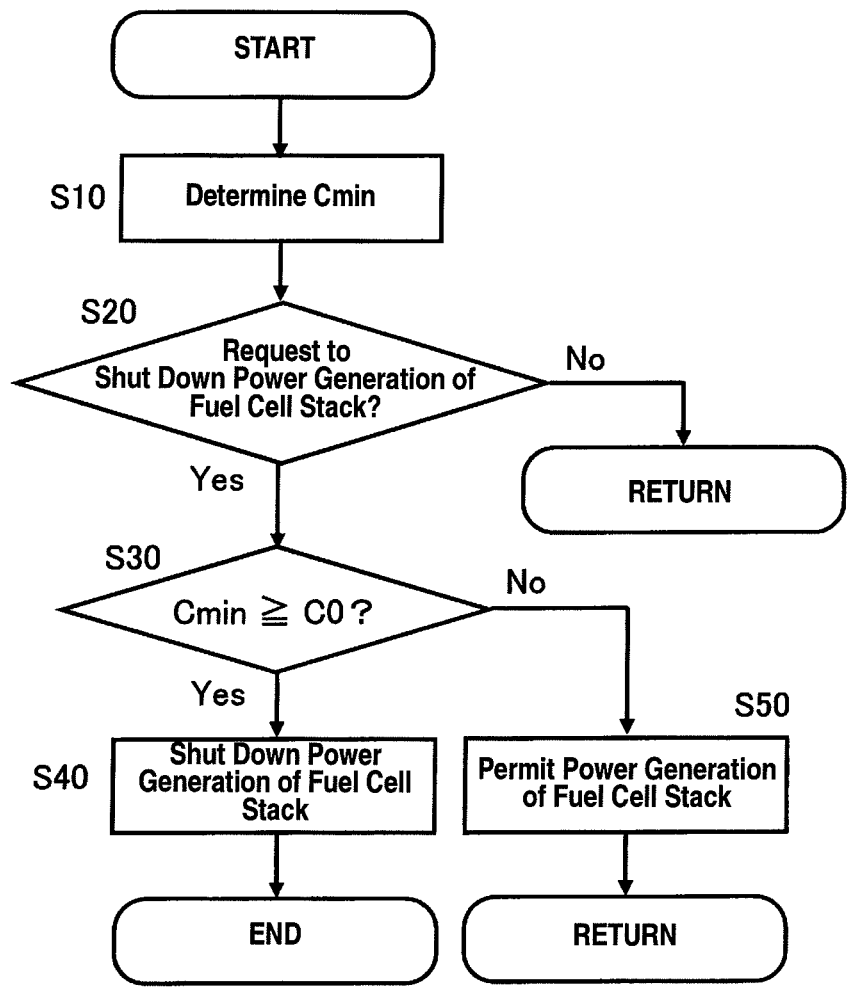
FIG. 6 is a flow chart illustrating a process executed by the controller for determining whether to permit/prohibit a transition to the shutdown of the fuel cell stack carried out by the fuel cell system in accordance with the first embodiment.

FIG. 6 is a flow chart illustrating the control process executed by the controller 4 for determining whether the conditions exist to either permit or prohibit the shutdown operation of the fuel cell stack 2 that is carried out by the fuel cell system 1 in the first embodiment. The process starting from step S10 is carried out by the controller 4.

In step S10, the lowest anode gas concentration Cmin in the flow channels is estimated. The method for estimating the lowest anode gas concentration Cmin in the flow channels will be explained with reference to FIG. 7.

Figure 7:
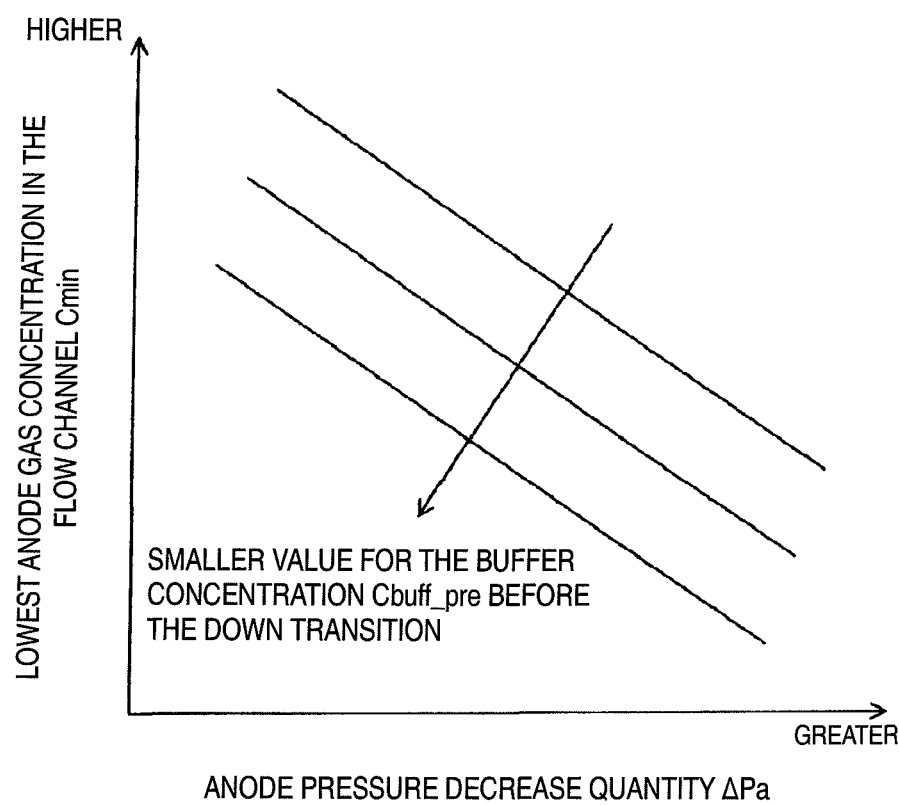
FIG. 7 is a map for calculating an estimated lowest anode gas concentration in the flow channel based on the amount of the anode pressure drop and the pre-lowering transition buffer concentration.

Referring to FIG. 7, a map is illustrated for computing the estimated lowest anode gas concentration Cmin in the flow channels based on the anode pressure decrease quantity ΔPa and the buffer concentration Cbuff_pre before the down transition as the control state of the anode gas at the time of the shutdown command. The anode pressure decrease quantity ΔPa is the differential pressure between the anode pressure right before the down transition operation and the current anode pressure. The buffer concentration Cbuff_pre before the down transition is the concentration of the anode gas in the buffer tank 36 right before the down transition operation, and this buffer concentration is detected by a sensor not shown in the Figures.

As shown in FIG. 6, the estimated lowest anode gas concentration Cmin in the down transition operation becomes lower when the anode pressure decrease quantity ΔPa becomes higher or when the buffer concentration Cbuff_pre before the down transition becomes lower.

The controller 4 estimates the anode pressure decrease quantity ΔPa and the buffer concentration Cbuff_pre before the down transition. The controller 4 then estimates the lowest anode gas concentration Cmin in the flow channels based on the map shown in FIG. 7 and the estimated anode pressure decrease quantity ΔPa and the buffer concentration Cbuff_pre before the down transition.

In step S20, a determination is made regarding whether or not there was a request to shut down the power generation in the fuel cell stack 2. For example, when idle stop is carried out by a vehicle provided with an idle stop function, a power generation shutdown request is output to the fuel cell stack 2. When a determination is made that there is no request to shut down the power generation in the fuel cell stack 2, the process returns to step S10. If there is a request to shut down the power generation, the process goes on to step S30.

In step S30, a determination is made regarding whether or not the lowest anode gas concentration Cmin in the flow channels that had been estimated in step S10 is above a prescribed concentration C0. Below, the method for determining the prescribed concentration C0 based on the system tolerance for the amount of decrease in the output of the fuel cell stack 2 the next time the power generation operation of the fuel cell stack 2 is restarted and the method for determining the prescribed concentration C0 based on the tolerance for the rate of degradation in the cathode catalyst during the time the power generation operation of the fuel cell stack 2 is shut down will be explained.

Figure 8:
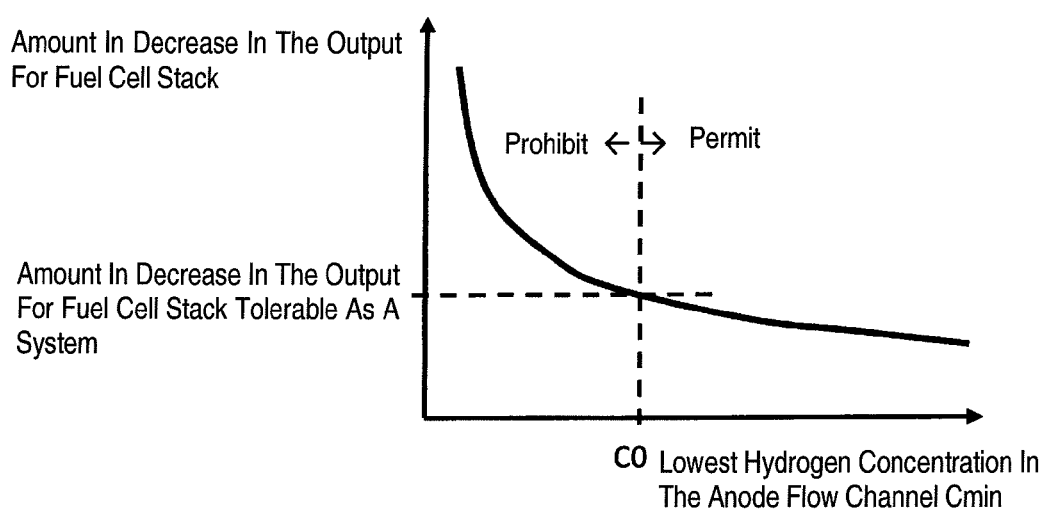
FIG. 8 is a graph conceptually illustrating the relationship between the lowest anode gas concentration in the flow channel and the amount of the decrease in the output of the fuel cell stack at the time the power generation operation is restarted.

FIG. 8 is a graph showing the relationship between the lowest anode gas concentration in the flow channel and the amount of decrease in the output of the fuel cell stack 2 when the power generation operation is restarted. As shown in FIG. 8, the amount of the decrease in the output of the fuel cell stack 2 at a time of restarting the power generation operation is made greater when the lowest anode gas concentration Cmin in the flow channels is the lowest. The prescribed concentration C0, which is the threshold value, is the anode gas concentration corresponding to the amount of the decrease in the output of the fuel cell stack 2 that can be tolerated as a system.

Figure 9:
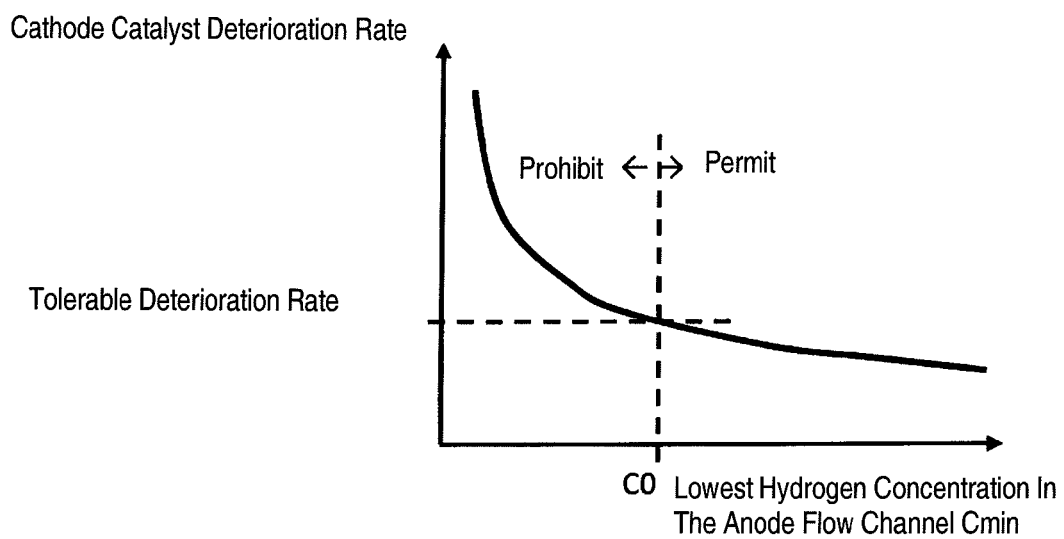
FIG. 9 is a graph conceptually illustrating the relationship between the lowest anode gas concentration in the flow channel and the degradation rate of the cathode catalyst when the power generation operation of the fuel cell stack is shut down.

FIG. 9 is a graph showing the relationship between the lowest anode gas concentration Cmin in the flow channels and the degradation rate of the cathode catalyst during the time when the power generation operation of the fuel cell stack 2 is shut down. As shown in FIG. 9, the degradation rate of the cathode catalyst is made greater when the lowest anode gas concentration Cmin in the flow channels is lower. The prescribed concentration C0, which is the threshold value, is the anode gas concentration corresponding to the tolerable cathode catalyst degradation rate.

When a determination is made in step S30, as shown in the flow chart in FIG. 6, that the lowest anode gas concentration Cmin in the flow channels that had been estimated in step S10 is above the prescribed concentration C0, the process proceeds to step S40, and the power generation operation of the fuel cell stack 2 is shut down. On the other hand, when a determination is made that the estimated lowest anode gas concentration Cmin in the flow channels is below the prescribed concentration C0, the power generation operation of the fuel cell stack 2 is continued.

As described above, according to the fuel cell system in the first embodiment, the anode gas concentration at a position wherein the anode concentration is locally low in the power generation region of the fuel cell is obtained in an anode non-circulation type fuel cell system, and a decision is made regarding whether to permit or prohibit a transition to shut down the power generation operation of a fuel cell. Consequently, it is possible to properly make a decision regarding whether to permit or prohibit a transition to shut down the power generation operation of a fuel cell in an anode non-circulation type fuel cell system by giving consideration to the anode gas concentration that has been made locally low in the power generation region. Therefore, preventing the power generating operation from being shut down at a time when the power generation operation should not be shut down is possible, degradation in the cathode catalyst can be suppressed during a shutdown, and degradation in the output response after restarting the operation can be prevented. Degradation in the catalyst occurs by a hydrogen front being formed by the cathode gas that had cross-leaked to the anode from the cathode during the shutdown of the power generation operation. Specifically, carbon that is supporting platinum as the electrical catalyst changes to carbon dioxide by reacting with the water produced by the electro-chemical reaction in the cathode, the platinum that was supported in the carbon elutes, and the catalytic function deteriorates.

In particular, making a transition to shut down the power generation operation of a fuel cell is permitted when the obtained anode gas concentration is above a prescribed concentration. Therefore, the power generation operation of a fuel cell being shut down in a state of low anode gas concentration can be prevented.

It is possible to secure an output response at the time when the operation is restarted after the shutdown of the power generation operation by setting the prescribed concentration for comparison with the obtained anode gas concentration at a concentration that complies with the tolerable amount of the decrease in the output of the fuel cell when restarting the power generation operation of the fuel cell from a state wherein the power generation operation had been shut down.

Also, it is possible to prevent the cathode catalyst from exceeding the system tolerance and deteriorating during the shutdown of the power generation operation by setting the prescribed concentration for comparison with the obtained anode gas concentration at a concentration that complies with the tolerance for the degradation rate whereat the cathode catalyst of the fuel cell deteriorates during the shutdown of the power generation operation.

Second Embodiment

In the fuel cell system of the first embodiment, the lowest anode gas concentration Cmin in the flow channels was estimated, and a determination was made regarding whether to permit/prohibit a transition to shut down the fuel cell stack 2 according to the estimated lowest anode gas concentration Cmin in the flow channel. In the fuel cell system of the second embodiment, a determination is made regarding whether to permit/prohibit a transition to shut down the fuel cell stack 2 according to the amount of the anode pressure decrease quantity ΔPa directly before the step to shut down the power generation operation of the fuel cell stack 2.

Figure 10:
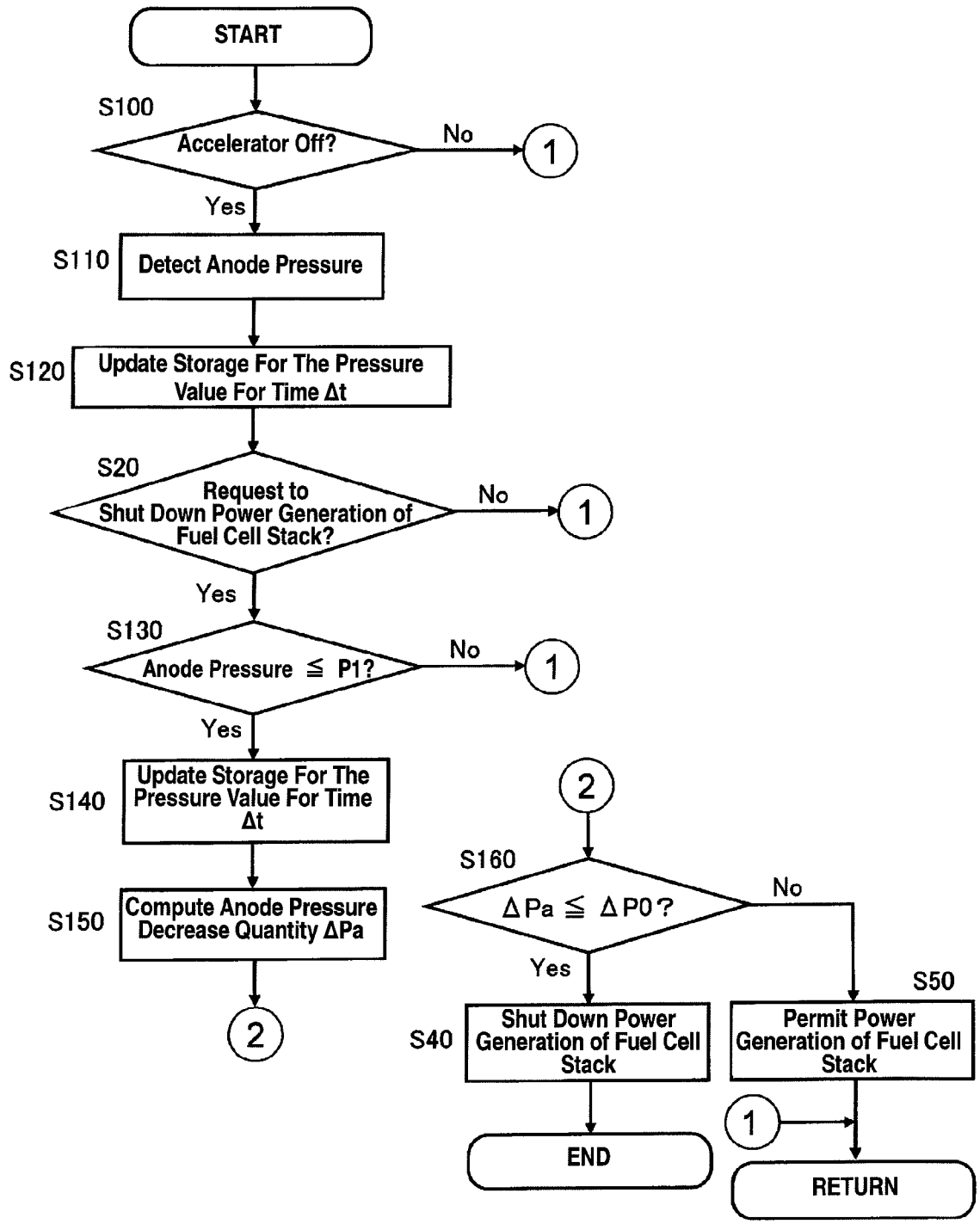
FIG. 10 is a flow chart illustrating a process executed by the controller for determining whether to permit/prohibit a transition to the shutdown of the fuel cell stack carried out by the fuel cell system in accordance with the second embodiment.

FIG. 10 is a flow chart showing the control process executed by the controller 4 for determining regarding whether to permit/prohibit a transition to shut down the fuel cell stack 2 carried out by the fuel cell system in the second embodiment. The same reference symbols will be used to describe the same steps that carry out the same processes as the processes in the flow chart shown in FIG. 6, and a detailed explanation will be omitted.

In step S100, a determination is made regarding whether or not the accelerator pedal of the vehicle has been set to off (e.g., not depressed). An accelerator pedal sensor not shown in the Figures detects the On/Off operation of the accelerator pedal. When a determination is made that the accelerator pedal has not been set to off, the process continuously repeats step S100. If a determination is made that the accelerator pedal was set to off, the process proceeds to step S110.

In step S110, the pressure sensor 34 detects the anode pressure.

In step S120, the anode pressure detected in step S110 is stored in the RAM of the controller 4, and the anode pressure detected prior to time Δt from the time the anode pressure was detected in step S110 is erased from the RAM. Consequently, the anode gas pressure detected during time Δt is stored in the RAM.

In step S20 that follows step S20, a determination is made regarding whether or not there was a request to shut down the power generation in fuel cell stack 2. If a determination is made that there is no request to shut down the power generation in fuel cell stack 2, then the process returns to step S100. On the other hand, the process proceeds to S130 if a determination is made that there was a request to shut down the power generation.

In step S130, the pressure sensor 34 detects the anode pressure, and a determination is made regarding whether or not the detected anode pressure is below the prescribed pressure P1. If a determination is made that the detected anode pressure is higher than the prescribed pressure P1, then the process returns to the beginning of the process. On the other hand, if a determination is made that the detected anode pressure is below the prescribed pressure P1, then the process proceeds to step S140.

In step S140, the anode pressure detected in step S130 is stored in the RAM of the controller 4 as well as erasing the anode pressure detected prior to time Δt from the time the anode pressure was detected in step S130 from the RAM. Consequently, the anode gas pressure detected during time Δt is stored in the RAM.

In step S150, the anode pressure decrease quantity ΔPa is calculated based on a difference between the maximum value in a plurality of anode pressure values stored in the RAM of the controller 4 and the anode pressure detected in step S130.

In step S160, a determination is made regarding whether or not the anode pressure decrease quantity ΔPa (the pressure differential) that had been calculated in step S150 is below a prescribed pressure difference ΔP0. Below, the method will be explained for determining the prescribed pressure difference ΔP0 based on the system tolerance for the drop rate in the output of the fuel cell stack 2 at the next time the power generation operation of the fuel cell stack 2 is restarted. Also below, the method will be explained for determining the prescribed pressure difference ΔP0 based on the tolerance for the rate of degradation in the cathode catalyst during the shutdown of the power generation operation of the fuel cell stack 2.

Figure 11:
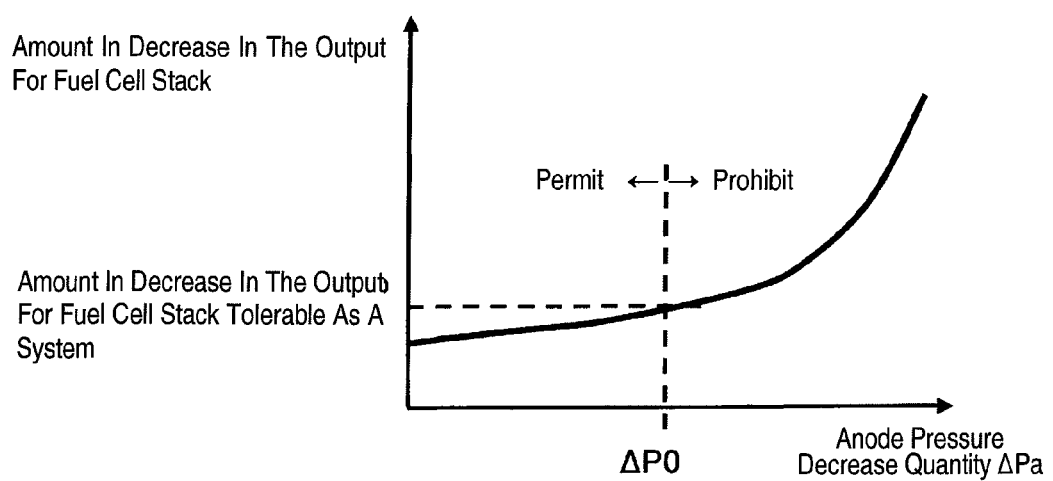
FIG. 11 is a graph conceptually illustrating the relationship between the amount of anode gas pressure drop and the amount of the decrease in the output of the fuel cell stack when the power generation operation is restarted.

FIG. 11 is a graph showing the relationship between the amount of anode pressure decrease quantity ΔPa and the amount of the decrease in the output of the fuel cell stack 2 at the time the power generation operation is restarted. As shown in FIG. 11, the amount of the decrease in the output of the fuel cell stack 2 at the time the power generation operation is restarted is made greater when the amount of anode pressure decrease quantity ΔPa is greater. The prescribed pressure difference ΔP0, which is the threshold value, is the amount of anode pressure drop corresponding to the amount of the decrease in the output of the fuel cell stack 2 capable of being tolerated as a system.

Figure 12:
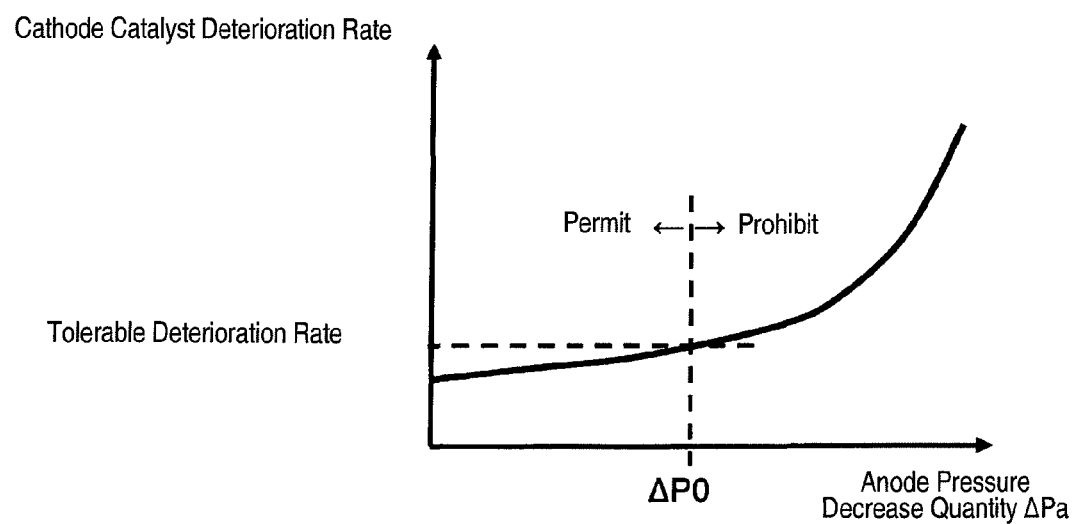
FIG. 12 is a graph conceptually illustrating the relationship between the amount of the anode gas pressure drop and the degradation rate of the cathode catalyst when the power generation operation of the fuel cell stack is shut down.

FIG. 12 is a graph showing the relationship between the amount of the anode pressure decrease quantity ΔPa and the degradation rate of the cathode catalyst during the time when the power generation operation of the fuel cell stack 2 is shut down. As shown in FIG. 12, the degradation rate in the cathode catalyst during the shutdown of the power generation operation is made greater when the amount of the anode pressure decrease quantity ΔPa is greater. The prescribed pressure difference ΔP0, which is the threshold value, is the anode pressure decrease rate corresponding to the tolerable cathode catalyst degradation rate.

When a determination is made in step S160, as shown in the flow chart in FIG. 10, that the pressure difference ΔPa is below the prescribed pressure difference ΔP0, the process proceeds to step S40, and the power generation operation of the fuel cell stack 2 is shut down. When a determination is made that the pressure difference ΔPa is higher than the prescribed pressure difference ΔP0, the process proceeds to step S50, and the power generation operation of the fuel cell stack 2 is continued.

Figure 13:
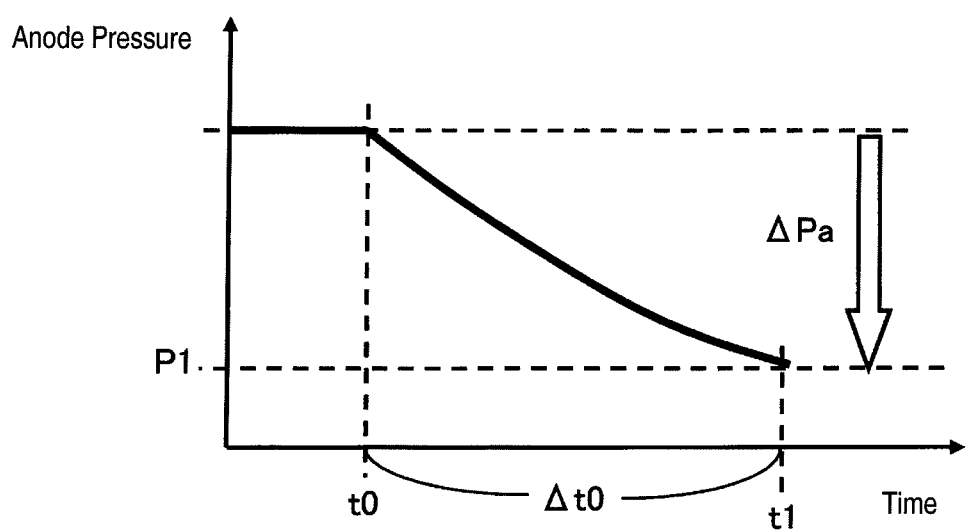
FIG. 13 is a graph conceptually illustrating an example of a time change in the anode gas pressure after the accelerator pedal has been set to off.

FIG. 13 is a graph showing an example of a time change in the anode gas pressure after the accelerator pedal is set to off. When the accelerator pedal is set to off (e.g., not depressed) at time t0, the pressure adjusting valve 33 is completely closed, and the anode pressure drops. Thereafter, the request to shut down the power generation operation of the fuel cell stack 2 is made, and the anode pressure drops to the prescribed pressure P1 at time t1.

In the example shown in FIG. 13, time Δt0 is necessary for the anode pressure to drop to the prescribed pressure P1 from time t0 when the accelerator pedal was set to off. The prescribed time Δt described above should be at least a time that is longer than the step down time Δt0 for when the pressure was decreased to the prescribed pressure P1 by completely closing the pressure adjusting valve 33.

In the example shown in FIG. 13, the anode pressure detected is stored in the RAM at time t0 when the accelerator pedal was set to off. Therefore, the difference between the anode pressure detected at time t0 and the anode pressure P1 detected at time t1 is calculated as ΔPa.

Figure 14:
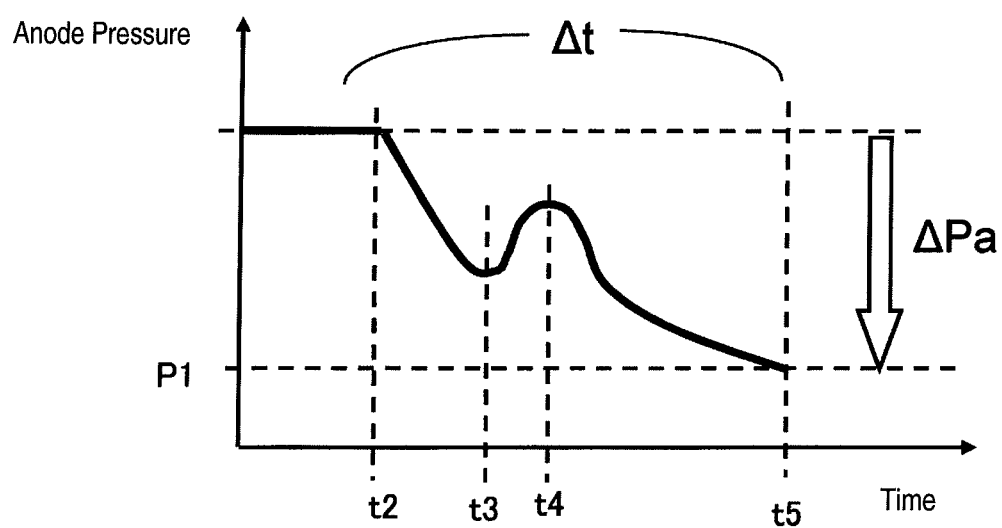
FIG. 14 is a graph conceptually illustrating another example of a time change in the anode gas pressure after the accelerator pedal has been set to off.

FIG. 14 is a graph showing another example of a time change in the anode gas pressure after the accelerator pedal is set to off. When the accelerator pedal is set to off at time t2, the pressure adjusting valve 33 is completely closed, and the anode gas pressure drops. When the accelerator pedal is turned on thereafter at time t3, the pressure adjusting valve 33 is open. However, when the accelerator pedal is set to off again at time t4, the pressure adjusting valve 33 is completely closed, and the anode gas pressure drops. Thereafter, there is a request to shut down the power generation operation of the fuel cell stack 2, and the anode pressure drops to the prescribed pressure P1 at time t5.

In the example shown in FIG. 14, the anode pressure detected at time t2 when the accelerator pedal was set to off and the anode pressure detected at time t4 when the accelerator pedal was set to off are stored in the RAM. Therefore, the difference between the higher pressure from among these two anode pressures, namely, the anode pressure detected at time t2 and the anode pressure P1 detected at time t5, is calculated as APa.

As described above, according to the fuel cell system in the second embodiment, the amount of pressure drop inside of the anode system directly before the shutdown of the power generation operation of the fuel cell is obtained, and a decision is made regarding whether to permit or prohibit a transition to shut down the power generation operation of a fuel cell according to the amount of the pressure drop in the anode system. Consequently, it is possible to properly make a decision regarding whether to permit or prohibit a transition to shut down the power generation operation of a fuel cell in an anode non-circulation type fuel cell system. Therefore, preventing the power generation operation from being shutdown at a time when the power generation operation should not be shut down is possible, degradation in the cathode catalyst can be suppressed during a shutdown, and degradation in the output response after restarting the operation can be prevented.

In particular, making a transition to shut down the power generation operation of a fuel cell is permitted when the obtained amount of the pressure drop in the anode system is below a prescribed amount of pressure drop. Therefore, the power generation operation of a fuel cell being shut down in a state of low anode gas concentration can be prevented.

It is possible to secure an output response at a time when the operation is restarted after the shutdown of the power generation operation by setting the prescribed amount of the pressure drop for comparison with the obtained amount of pressure drop in the anode system to be an amount of the pressure drop that complies with the tolerable amount of decrease in the output of the fuel cell when restarting the power generation operation of the fuel cell from a state wherein the power generation operation had been shut down.

Also, it is possible to prevent the cathode catalyst from exceeding the system tolerance and deteriorating during the shutdown of the power generation operation by setting the prescribed amount of the pressure drop for comparison with the obtained amount of the pressure drop in the anode system to be an amount of pressure drop that complies with the tolerance for the degradation rate whereat the cathode catalyst of the fuel cell degrades during the shutdown of the power generation operation.

The present invention is not restricted to the embodiments described above. For example, an explanation was given by citing an example wherein the fuel cell system was installed in a vehicle. However, the present invention can also be applied to various items other than a vehicle.

Moreover, while the fuel cell system is illustrated as an anode non-circulation type fuel cell system, the present invention can also be used with a circulating type of a fuel cell system. Furthermore, the present invention can also be applied to a pulsation control of a circulating fuel cell system.

The lowest anode gas concentration Cmin in the flow channels was estimated based on the amount of the anode pressure decrease quantity ΔPa and the buffer concentration Cbuff_pre before the down transition. However, it is possible to provide a plurality of sensors for detecting the anode gas concentration to detect the lowest anode gas concentration. Also, obtaining the position whereat the anode gas concentration is made to be the lowest in advance according to experiments or the like is possible, and providing a sensor that detects the anode gas concentration at that position is possible.

In understanding the scope of the present invention, the term "configured" as used herein to describe a component, section or part of a device includes hardware and software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A fuel cell system comprising:
   a fuel cell configured to receive anode gas and cathode gas to generate electric power;
   a control valve configured to control pressure of the anode gas being fed to the fuel cell;
   a buffer tank located downstream of the fuel cell, the buffer tank being configured to store anode-off gas exhausted from the fuel cell; and
   a controller including
      a pulsation operation control section configured to control the control valve so that the pressure of the anode gas flowing downstream of the control valve is periodically increased and decreased to maintain the pressure of anode gas within the fuel cell between an upper limit and a lower limit, the pulsation operation control section being further configured to close the control valve to allow the anode gas stored in the buffer tank to flow back into the fuel cell when the pressure in the buffer tank exceeds the pressure in the fuel cell, thereby maintaining the pressure of anode gas within the fuel cell between the upper and lower limit,
      a shutdown control section configured to execute a shutdown operation of the fuel cell by closing the control valve to stop feeding of the anode gas and shutting down power generation of the fuel cell upon receiving a shutdown command to shut down the power generation,
      an anode gas concentration acquiring section configured to estimate an anode gas concentration at a location where the anode gas concentration is locally lower within a power generation region of the fuel cell based on a control state of the anode gas at a time the shutdown command is issued, and
      a shutdown operation determination section configured to determine whether to permit or prohibit shutting down the power generating operation of the fuel cell based on the anode gas concentration that was estimated by the anode gas concentration acquiring section.

2. The fuel cell system according to claim 1, wherein
the controller further includes an anode pressure drop acquiring section configured to estimate an anode pressure decrease quantity directly before shutting down of the power generation operation of the fuel cell, the anode gas concentration acquiring section determining the anode gas concentration at the location where the anode gas concentration is locally lower based on the anode pressure decrease quantity.

3. The fuel cell system according to claim 2, wherein
the shutdown operation determination section permits shutting down the power generation operation of the fuel cell upon determining that the anode pressure decrease quantity is below a prescribed anode pressure decrease quantity.

4. The fuel cell system according to claim 3, wherein
the prescribed anode pressure decrease quantity is an amount of pressure drop corresponding to a tolerance value for an amount of a decrease in an output of the fuel cell when the power generation operation of the fuel cell is restarted from a state where the power generating operation has been shut down.

5. The fuel cell system according to claim 3, wherein
the prescribed anode pressure decrease quantity is an amount of pressure drop corresponding to a tolerance value for an amount of degradation of a cathode catalyst during a time when the power generation operation has been shut down.

6. A fuel cell system comprising
a fuel cell configured to receive anode gas and cathode gas to generate electric power;
a control valve configured to control pressure of the anode gas being fed to the fuel cell; and
a controller including
   a pulsation operation control section configured to control the control valve so that the pressure of the anode gas flowing downstream of the control valve is periodically increased and decreased,
   a shutdown control section configured to execute a shutdown operation of the fuel cell by closing the control valve to stop feeding of the anode gas and shutting down power generation of the fuel cell upon receiving a shutdown command to shut down the power generation,
   an anode gas concentration acquiring section configured to estimate an anode gas concentration at a location where the anode gas concentration is locally lower within a power generation region of the fuel cell based on a control state of the anode gas at a time the shutdown command is issued, and
   a shutdown operation determination section configured to determine whether to permit or prohibit shutting down the power generating operation of the fuel cell based on the anode gas concentration, the shutdown operation determination section being configured to permit shutting down the power generation operation of the fuel cell upon the estimation of the anode gas concentration obtained by the anode gas concentration acquiring section being above a prescribed concentration.

7. The fuel cell system according to claim 6, wherein
the shutdown operation determination section sets the prescribed concentration as a concentration corresponding to a tolerance value for an amount of a decrease in an output of the fuel cell when the power generation operation of the fuel cell is restarted from a state where the power generation operation has been shut down.

8. The fuel cell system according to claim 7, wherein
the controller further includes an anode pressure drop acquiring section configured to estimate an anode pressure decrease quantity directly before shutting down the power generation operation of the fuel cell, the anode gas concentration acquiring section determining the anode gas concentration at the location where the anode gas concentration is locally lower based on the anode pressure decrease quantity.

9. The fuel cell system according to claim 8, wherein
the shutdown operation determination section permits shutting down the power generation operation of the fuel cell upon determining that the anode pressure decrease quantity is below a prescribed anode pressure decrease quantity.

10. The fuel cell system according to claim 8, wherein
the prescribed anode pressure decrease quantity is an amount of pressure drop corresponding to a tolerance value for an amount of a decrease in an output of the fuel cell when the power generation operation of the fuel cell is restarted from a state where the power generating operation has been shut down.

11. The fuel cell system according to claim 8, wherein
the prescribed anode pressure decrease quantity is an amount of pressure drop corresponding to a tolerance value for an amount of degradation of a cathode catalyst during a time when the power generation operation has been shut down.

12. The fuel cell system according to claim 6, wherein
the shutdown operation determination section sets the prescribed concentration as a concentration corresponding to a tolerance value for an amount of degradation of a cathode catalyst during a time when the power generation operation has been shut down.

13. The fuel cell system according to claim 12, wherein
the controller further includes an anode pressure drop acquiring section configured to estimate an anode pressure decrease quantity directly before shutting down the power generation operation of the fuel cell, the anode gas concentration acquiring section determining the anode gas concentration at the location where the anode gas concentration is locally lower based on the anode pressure decrease quantity.

14. The anode non-circulation type fuel cell system according to claim 6, wherein
the controller further includes an anode pressure drop acquiring section configured to estimate an anode pressure decrease quantity directly before shutting down the power generation operation of the fuel cell, the anode gas concentration acquiring section determining the anode gas concentration at the location where the anode gas concentration is locally lower based on the anode pressure decrease quantity.

15. The fuel cell system according to claim 14, wherein
the shutdown operation determination section permits shutting down the power generation operation of the fuel cell upon determining that the anode pressure decrease quantity is below a prescribed anode pressure decrease quantity.

16. The fuel cell system according to claim 14, wherein
the prescribed anode pressure decrease quantity is an amount of pressure drop corresponding to a tolerance value for an amount of a decrease in an output of the fuel cell when the power generation operation of the fuel cell is restarted from a state where the power generating operation has been shut down.

17. The fuel cell system according to claim 14, wherein
the prescribed anode pressure decrease quantity is an amount of pressure drop corresponding to a tolerance value for an amount of degradation of a cathode catalyst during a time when the power generation operation has been shut down.

* * * * *